United States Patent [19]

Laufer

[11] Patent Number: 5,393,543
[45] Date of Patent: * Feb. 28, 1995

[54] PROCESS FOR PREPARING LOW FAT POTATO CHIPS AND SHOESTRING POTATOES

[76] Inventor: Stephen Laufer, 1452 Cerro Gordo St., Los Angeles, Calif. 90026

[*] Notice: The portion of the term of this patent subsequent to Mar. 8, 2011 has been disclaimed.

[21] Appl. No.: 154,253

[22] Filed: Nov. 18, 1993

Related U.S. Application Data

[63] Continuation-in-part of Ser. No. 30,794, Mar. 12, 1993, Pat. No. 5,292,540, which is a continuation-in-part of Ser. No. 712,943, Jun. 10, 1991, Pat. No. 5,194,277.

[51] Int. Cl.⁶ ............................................. A23L 1/217
[52] U.S. Cl. .................................... 426/242; 426/243; 426/637
[58] Field of Search ............... 426/241, 242, 243, 510, 426/511, 523, 637, 506, 509

[56] References Cited

U.S. PATENT DOCUMENTS

| | | | |
|---|---|---|---|
| 3,881,028 | 4/1975 | Carposella et al. | 426/242 |
| 4,073,952 | 2/1978 | Standing et al. | 426/242 |
| 4,283,425 | 8/1981 | Yuan et al. | 426/242 X |
| 4,800,090 | 1/1989 | August | 426/243 |
| 4,906,483 | 3/1990 | Kloos | 426/243 |
| 4,919,965 | 4/1990 | Childers | 426/523 X |
| 5,049,711 | 9/1991 | August | 426/242 |
| 5,180,601 | 1/1993 | Gaon et al. | 426/242 |
| 5,202,139 | 4/1993 | Gaon et al. | 426/243 X |

FOREIGN PATENT DOCUMENTS 3443218  5/1986  Germany ............................ 426/242

*Primary Examiner*—Arthur L. Corbin
*Attorney, Agent, or Firm*—Lyon & Lyon

[57] ABSTRACT

A process for preparing potato chips, shoestring potatoes and other tuber chips in which no additional fat content is added to the potato and none of the natural foodstuffs are removed. The process comprises the steps of slicing a potato or other tuber to produce a plurality of slices or strips of the desired configuration, heating the slices or strips to a temperature and for a period of time sufficient to remove from about fifty to eighty percent of the moisture therefrom, and microwave heating the slices or strips to produce a product having substantially the same flavor, color, crispness and slightly greasy appearance as deep-fried products. The slices or strips can be subjected to a second microwaving step at a reduced power level to reduce the moisture content of the product for a longer shelf life.

57 Claims, No Drawings

PROCESS FOR PREPARING LOW FAT POTATO CHIPS AND SHOESTRING POTATOES

This application is a continuation-in-part of application Ser. No. 08/030,794, filed Mar. 12, 1993, now U.S. Pat. No. 5,292,540, which is a continuation-in-part of Ser. No. 07/712,943, filed Jun. 10, 1991, now U.S. Pat. No. 5,194,277.

BACKGROUND OF THE INVENTION

The present invention relates to a process for producing potato chips and shoestring potatoes, which have substantially the same flavor, color and crispness as well as a slightly greasy appearance similar to conventional deep-fried products but in which no fat content is added to the potato and no foodstuff is removed. Potato chips and shoestring potatoes are typically produced by deep frying thin slices or strips of raw potatoes in an oil. The deep frying process reduces the water content in the potatoes while adding oil to the product to produce the desired color and crispness. However, the resulting product contains considerable oil, and thus fat, which is generally unhealthy.

With increased public awareness of the benefits of low fat foods, efforts have been undertaken to develop alternate methods for producing the ever popular potato chip. Examples of such efforts are seen in U.S. Pat. Nos. 4,277,510, 4,283,425, 4,749,579 and 4,906,483. While reducing the fat content of the resulting chip in comparison to the conventional deep frying process, the processes described in U.S. Patent Nos. 4,277,510 and 4,749,579 continue to employ the step of frying the slices of potato in an oil and thus continue to add fat to the chip. The process described in U.S. Pat. No. 4,906,483 like the present invention, employs microwave heating in lieu of deep frying, but additionally teaches the removal of the starch from the potato chip and thus does not provide the whole food content of the potato. The process described in U.S. Pat. No. 4,283,425 also employs microwave cooking in lieu of frying to avoid the addition of fat to the chip but teaches the necessity of coating the chip prior to the microwave heating thereof with a globular protein such as soy isolate or egg albumen. As certain individuals are allergic to soy and dairy products and others prefer natural foods with no additives, such a process would be somewhat limited in its appeal. In contrast to the above processes, the process of the present invention not only provides potato chips having substantially the same flavor, color, crispness and a slightly greasy appearance similar to conventional deep-fried potato chips, without the need for deep-frying, but does so without the addition or deletion of any food content to the natural potato. The result is a completely natural potato chip which is very low in fat.

SUMMARY OF THE INVENTION

Briefly, the present invention is directed to a process for preparing potato chips having substantially the same flavor, color, crispness and a slightly greasy appearance similar to deep-fried potato chips but in which no fat content is added to the natural potato and none of the natural foodstuffs therein are removed. The process comprises the steps of washing the potatoes to remove foreign matter from the skin thereof, cutting the potato into thin slices, optionally washing or blanching the slices, and heating the slices of potato in a microwave oven for about three to ten minutes depending on the power and efficiency of the microwave equipment and the quantity of slices being subjected to the microwaves. Depending on the food contact surface used in the microwave oven, the slices of potato can be rotated 180° at the mid-point of the microwave heating step to prevent the potato slices from adhering to the contact surface. After heating, the chips are removed from the microwave oven and are ready for consumption. If desired, salt can be added prior to or after the microwave heating. Other natural seasonings can also be added to the chips but preferably after microwave heating to avoid burning the seasonings.

To reduce the cooking time in the microwave oven and the costs associated therewith, the potato slices are preferably preheated prior to microwaving. While baking and steaming have been successfully employed in this preheating step, it has been found that preheating with dry heat, i.e., baking, is preferred due to the reduction in the moisture content of the slices which can be achieved with dry heat. Substantially reducing the moisture level in the slices prior to microwaving not only reduces the microwaving time but appears to provide a superior product. Such preheating should be conducted at a temperature and for a time sufficient to remove from about 50% to 80% of the moisture from the slices prior to microwaving and preferably between 65% to 70%. By preheating the slices at a relatively high temperature and for a relatively short period of time to obtain such a reduction in the moisture content of the slices, the subsequently microwaved chips consistently exhibit the same flavor, color, crispness and slightly greasy appearance as deep-fried potato chips. If a reduced moisture content is desired in the chip to increase the shelf-life of the product, the time of the microwave heating step can be slightly extended or, more preferably, the cooked chips can be subjected to a microwave drying step wherein the chips are again exposed to microwave energy, but at a lower intensity. Completing the chip preparation process at a lower microwave power level provides more control over the final moisture level of the chips through variations in the time and power level of the microwave drying step. In addition to producing low fat potato chips, the process of the present invention can also be used to produce shoestring potatoes and other tuber chips and shoestrings without the addition of any fat and without removing any of the natural foodstuffs.

It is the principal object of the present invention to provide an improved process for preparing potato chips which have the same flavor, color, crispness and slightly greasy appearance as deep-fried potato chips but which does not add any additional fat content to the natural potato nor removes any of the natural foodstuffs from the potato.

It is another object of the present invention to provide an improved process for preparing potato chips which obviates the need to add any other food item or chemical to the potato during the process.

It is yet another object of the present invention to provide an improved process for preparing potato chips which eliminates the need to fry the chips in oil during the process.

It is yet another object of the present invention to provide an improved process for preparing shoestring potatoes which does not add any additional fat content to the natural potato to provide a low fat shoestring potato and which does not remove any of the natural foodstuffs from the potato.

These and other objects and advantages of the present invention will become readily apparent from the following detailed description.

DESCRIPTION OF TEE PREFERRED EMBODIMENT

In the process of the present invention, the potatoes are first washed and scrubbed in a customary manner to remove any foreign matter from the exterior skin thereof. The washed potatoes are then sliced, preferably without removing the skins, to a thickness of about 1/16 of an inch. The potato slices can then be washed or blanched as is customarily done in a conventional potato chip manufacturing process. The chips are laid on a ceramic or other suitable plate, placed in a microwave oven and heated in the microwave oven from about three to ten minutes, depending on the wattage of the microwave oven and the quantity of the slices being cooked. In a typical microwave oven designed for home use and having a power rating of about seven hundred to one thousand watts and operating at about 2450 Mhz, a batch of about two dozen of the cut slices are heated for about six to ten minutes at a full power setting, with about eight minutes being the optimum heating time. In a commercial microwave unit having a power rating within the range of about fifty to three hundred kilowatts and operating at about 915 Mhz, the heating time could be reduced to one minute or less, depending on the power and efficiency of the microwave oven and number of chips being cooked.

To prevent the potato slices from adhering to the plate, the slices are preferably turned 180° at the midpoint of the heating. If a non-stick plate surface is employed, turning of the potato slices is not necessary. Alternatively, a support tray could be employed for stacking the slices on and in a vertical disposition within the microwave oven to prevent the potato slices from sticking to the plate without the need for interrupting the heating process to turn the slices. For commercial operations, a continuous heating cycle could be employed in which the potato slices are placed on a conveyor which runs through a microwave heating station for mass producing the potato chips of the present invention. At the completion of the heating period in the microwave oven, the chips are removed and are ready for consumption or packaging.

In certain instances, it may be desirable to reduce the time of the microwave heating process for energy or other considerations. By heating the slices of potatoes prior to microwaving (referred to herein as preheating), the time necessary for microwaving the then partially cooked potato slices can be reduced. It has been found that preheating the slices in an oven such that from about 50% up to 80% of the moisture content of the slices is removed prior to microwaving significantly reduces the microwaving time and the costs associated therewith. Removal of about 65% to 70% is actually preferred. If more than 80% of the moisture is removed, the slices become too hard and the subsequent microwaving step will not produce the desired crisp and light chip. If less than 50% of the moisture is removed, the potential benefits resulting preheating are not fully realized. The moisture reduction can be achieved in a non-commercial application by heating the slices at a temperature within the range of about 250 to 500 degrees Fahrenheit. For example, baking the chips at about 400° F. for a period of six to twelve minutes will reduce the microwave cooking time in a home microwave oven to about three to seven minutes, with the optimum baking time for about twenty chips being about ten minutes and the microwave cooking time being about 5 minutes.

In mass production commercial applications of the present invention, preheating at higher temperatures for shorter periods of time is preferred, both to reduce the microwaving time and to enhance the quality of the product. It has been found that by baking the slices at high temperatures within the range of about 500° to 800° Fahrenheit for about 30 to 120 seconds, and preferably at about 700° F. for 50 seconds, not only can the microwaving time be reduced to about 20 seconds to 5 minutes, depending on the volume of slices and the microwaving apparatus, but the quality of the product is improved. It is believed that the preheating temperature range could be extended to about 900° F. which would reduce the lower end of the preheating time range to about 20 seconds. By preheating within this higher temperature range, the air pockets common to deep-fried chips begin to form during the preheating of the raw slices and, the subsequent microwaving appears to more consistently provide the chips with the same light crispiness and texture of deep-fried chips.

By way of example, potato chips having the same flavor, color, crispness and slightly greasy appearance as deep-fried potato chips but having no added fat content could be produced by baking 25 pounds of potato slices of about 1/16 of an inch thick in an oven for 50 seconds at 700° Fahrenheit. The preheated chips are then directed to a microwave oven having a power rating of about 120 kw and exposed to the microwaves for a period of about 115 seconds.

Similar results might also be obtained in commercial applications at lower temperatures in the range of 250° to 500° Fahrenheit by using ovens providing a heated airflow directed about the potato slices. The movement of heated air about the slices during a pre-microwave heating step promotes more rapid moisture removal from the slices and thus reduces the preheating time. The more rapid air movement about the slices, the more quickly the moisture is removed. However, the use of rapidly circulating air about the slices in the oven tends to produce a chip which has a somewhat dull appearance. This can be overcome by steaming the raw slices prior to such preheating until the slices exhibit a slick, shiny appearance. This typically occurs in about 30 to 90 seconds. The slices could also be boiled in water for a period of about 10 seconds to one minute in lieu of steaming but with boiling, the slick, shiny appearance, which is indicative of the completion of this step, is not readily apparent.

While a precise correlation between preheating times and temperatures and microwaving power ratings and times has not been determined, increasing the temperature in the preheating step and/or providing heated air movement during the step will reduce the preheating time required to obtain the desired moisture reduction. Increasing the moisture reduction within the prescribed limits will reduce the microwaving time. However, potato slices preheated to the desired moisture reduction level at an elevated temperature within the range of about 500° to 900° F., and preferably at about 700° F., will generally provide a superior chip to slices preheated at a lower temperature and for a longer time to provide the same moisture reduction level. The overall chip processing time in commercial applications employing a preheating step could be reduced by overlapping the preheating and microwaving steps. In such instances, the preheating temperature would preferably be reduced during the overlapping period, particularly if a relatively high preheating temperature were employed. In addition, the microwave energy may be applied intermittently to reduce total energy consumption.

To increase the shelf life of the chips cooked by the above-described preheating and microwaving steps, the cooked chips could be further dried by a second microwaving step. This could be accomplished with a typical home microwaving oven with a maximum power rating of one kilowatt by subjecting the cooked chips to the microwaves at a medium power setting for a period of about one and one half to six minutes, with about three minutes being preferred. In a commercial application, the power in the second microwave unit would be reduced by at least 50% and more typically 75% to 80% from that employed in the microwave cooking step and the chips would also be exposed to the microwaves for about one to six minutes.

If desired, salt or other natural seasonings can be added to the potato slices. Salt can be added prior to or after heating the chips in the microwave oven, whereas other seasonings which are susceptible to burning should be added after the microwave heating step. If seasonings are added to the potato slices after microwave heating, it may be necessary to add a very small amount of oil or other suitable medium to the cooked chips or to the seasoning so that tile seasoning will adhere to the cooked potato product. Such a medium could comprise a solution of water and gum acacia. When using such as medium, the water would have to be evaporated by the subsequent application of heat at a temperature and for a time which did not further cook the chips. It has been found that an attractive flavor can be added to the chips without adding any fat and without the need for such an additional application of heat by dipping or soaking the raw slices in a vinegar and water solution, preferably employing red wine vinegar, prior to the preheating step. Other non-fat flavorings in a liquid state could be similarly applied to the chips if desired.

Completing the process at a lower power allows for better control over the moisture level of the final product through variations in the time of the second microwaving step and/or by regulating the power level at which this final drying step is conducted. It also allows for better control over the final appearance of the chips in that the coloring of the chips can be more closely regulated at the lower power level to meet the manufacturer's desires. When employing a second microwaving step at a reduced power level for improved moisture control over the process, the duration of the microwave cooking step may be slightly reduced. The moisture control of the chips can be further enhanced by introducing heated air into the microwave oven during the second microwave step at a temperature of from about 150° to 400° Fahrenheit (preferably about 275° F.). To optimize such moisture control as well as control over desired color variations, the temperature of such air should be selectively variable within this range. In some instances, the additional drying of the chips might be achieved solely with the use of heated air without the second microwaving step. Alternatively, a radio frequency dryer could be used in lieu of a second microwaving. The use of radio frequency waves for further drying of the chips may be advantageous when it is desired to remove moisture from the chips with minimal heating of the chips so as to avoid further browning. A radio frequency dryer suitable for such purposes is marketed by Proctor Strayfield, a division of Proctor and Schwartz of Horsham, PA.

An example of apparatus for commercially producing chips in accordance with the present invention comprises a conveyor system to provide continuous chip production, a gas-fired oven and one or two microwaving stations. The individual slices would be continuously transported on the conveyor through the oven in a spaced array so as to provide even heating of the individual chips. The speed of the conveyor through the oven would be set relative to the oven temperature, preferably at about 700° F., to provide the residence time within the oven necessary to achieve the desired moisture reduction within the slices. The conveyor could comprise a single belt traveling linearly through the oven or, to reduce the overall length of the oven, a single belt traveling in a tortuous path or a plurality of belts arranged such that the potato slices travel back and forth within the oven as they are deposed from one belt onto another. A conveyor belt would then transport the preheated chips from the oven into a microwave station where the chips would be subjected to the microwaves for a predetermined period of time, preferably at a relatively high power level of about 300 kw, although power ratings within the range of from about 1 kw up to 600 kw could be employed. The upper power limit of the microwave station has yet to be established. The conveyor belt moves the chips through the microwave station at a speed selected so as to provide the necessary microwave heating time within the station given the extent of preheating and the power level of the microwave station. Alternatively, the conveyor belt could transfer the chips within the microwave station in a stacked disposition onto one or more slower moving belts after such time as the chips were sufficiently dried so as not to stick together. Through such a multi-belt configuration, the size of the microwave station could be reduced. The chips are then conveyed through a reduced power microwave station for further drying of the chips to the final desired moisture level for prolonged shelf life which is generally about 2%. To provide flexibility in the system, the speed of the conveyor belt or belts employed in the conveyor system would be adjustable as would be the oven temperature and power levels in the microwave stations.

In addition to potato chips, the aforesaid process can be used to produce shoestring style potatoes. To produce shoestring potatoes, the same process is employed except that the potatoes, after washing are sliced into elongated or curved strips of the desired configuration and length, preferably about 1/16-⅛ in. in thickness, and heated in a home microwave oven for about six to twelve minutes depending on thickness of the strips or for as short a time as about one minute in a commercial microwave oven. As with the potato slices, the potato strips can also be preheated prior to microwaving to reduce the microwave heating time. As shoestring potatoes are generally somewhat thicker than potato chips, their preheating and microwaving times will be slightly greater than the corresponding times for pre-heating and microwaving the slices used in the production of potato chips. For example, by baking the strips at about 400° Fahrenheit for about six to fourteen minutes, the microwave heating time is reduced to about three to ten minutes in home units and to about thirty seconds to six minutes in commercial microwave unit, depending on the power and efficiency of the microwave oven and the number of strips being cooked. If the strips were preheated in a commercial application by baking at a temperature of about 700° F. for a period of about one minute, the microwaving time required to produce the desired product would be about two and one-quarter minutes. As with the chips, the microwaved strips could be further dried by a second microwaving step to increase the shelf life of the product. This could be accomplished by using substantially the same above-described parameters employed with the potato chips.

Other low fat chips comprised of other tubers and vegetables such as sweet potatoes, yams and beets as well as chips comprised of mixed ingredients, such as tortilla chips, could also be prepared utilizing the aforesaid processes. With chips employing mixed ingredients such as tortilla chips, the chips would be press formed in a conventional manner, as opposed to sliced, and then microwave cooked, baked and microwave cooked or baked, microwave cooked, and microwave dried as previously described. In the preparation of tortilla chips, however, the baking time is preferably reduced to a range of about twenty seconds to two minutes while the baking temperature range can range from about 250 to 900 degrees Fahrenheit depending on the type and configuration of oven being used. In addition, if a second microwave step were employed after the microwave cooking step to further dry and increase the shelf life of the chips, the cooked tortilla chips would be exposed to the microwaves at the above-described reduced power settings for a period of about 45 seconds to 5 minutes.

Various changes and modifications may be made in carrying out the present invention without departing from the spirit and scope thereof. Insofar as these changes and modifications are within the purview of the appended claims, they are to be considered as part of the present invention.

I claim:

1. A method for preparing a potato product having a low fat content in which none of the natural foodstuffs of the potato are removed, said method consisting of the following steps: cutting a potato to produce a plurality of potato slices; heating the slices at a temperature and for a time sufficient to remove from 50% to 80% of the moisture from the slices; and microwave heating the heated slices for a period of about 20 seconds to 5 minutes to produce a product having substantially the same flavor, color, crispness and slightly greasy appearance as deep-fried potato chips and having no added fat content.

2. The method of claim 1 including the step of adding salt to the potato slices prior to the microwave heating step.

3. The method of claim 1 including the step of adding natural seasoning to the potato slices after the microwave heating step.

4. The method of claim 1 wherein said heating step comprises baking said slices in an oven at a temperature within the range of about 500° to 900° Fahrenheit.

5. A method for preparing a potato product having a low fat content in which none of the natural foodstuffs of the potato are removed, said method consisting of the following steps: cutting a potato to produce a plurality of potato slices; heating the slices at a temperature and for a time sufficient to remove from 50% to 80% of the moisture from the slices; microwave heating the heated slices at a first power level for a period of about 20 seconds to 5 minutes; and then microwave heating the slices at a second power level lower than said first power level to produce a product having substantially the same flavor, color, crispness and slightly greasy appearance as deep-fried potato chips and having no added fat content.

6. The method of claim 5 including adding salt to the potato slices prior to the first microwave heating step.

7. The method of claim 5 including the step of adding natural seasoning to the potato slices after the microwave heating step at said first power level.

8. The method of claim 5 wherein said first heating step comprises baking said slices in an oven at a temperature within the range of about 500° to 900° Fahrenheit.

9. A method for preparing a potato product having a low fat content in which none of the natural foodstuffs of the potato are removed, said method comprising the following steps: cutting a potato product to produce a plurality of potato slices; baking the slices for a period of about 20 seconds to 5 minutes within a temperature range of about 500° to 900° Fahrenheit; microwave heating the baked slices for a first power level for a period of about 10 to 90 seconds; and then microwave heating the slices at a second power level lower than said first power level to produce a product having substantially the same flavor, color, crispness and slightly greasy appearance as deep-fried potato chips and having no added fat content.

10. The method of claim 9 wherein said chips are heated at said second power level for a period of about 1 to 6 minutes.

11. The method of claim 9 including the step of adding salt to the potato slices prior to the first microwave heating step.

12. The method of claim 9 including the step of adding natural seasoning to the potato slices after the first microwave heating step.

13. A method for preparing a potato product having a low fat content in which none of the natural foodstuffs of the potato are removed, said method comprising the following steps: cutting a potato product to produce a plurality of potato slices; baking the slices for a period of about 20 seconds to 5 minutes within a temperature range of about 500° to 900° Fahrenheit and microwave heating the baked slices for a period of about 10 to 90 seconds to produce a product having substantially the same flavor, color, crispness and slightly greasy appearance as deep-fried potato chips and having no added fat content.

14. The method of claim 13 including adding salt to the potato slices prior to the microwave heating step.

15. The method of claim 13 including the step of adding natural seasoning to the potato slices after the microwave heating step.

16. A method for preparing a potato product having a low fat content in which none of the natural foodstuffs of the potato are removed, said method comprising the following steps: cutting a potato to produce a plurality of potato slices; heating the slices at a temperature and for a time sufficient to remove from 50% to 80% of the moisture from the slices; and microwave heating the heated slices at a power level and for a time sufficient to produce a product having substantially the same flavor, color, crispness and slightly greasy appearance as deep-fried potato chips and having no added fat content.

17. The method of claim 16 including the step of adding salt to the potato slices prior to the microwave heating step.

18. The method of claim 16 including the step of adding natural seasoning to the potato slices after the microwave heating step.

19. The method of claim 16 wherein said heating step comprises baking said slices in an oven at a temperature within the range of about 250° to 900° Fahrenheit.

20. The method of claim 16 wherein said microwaving step occurs continuously.

21. The method of claim 16 wherein at least a portion of said heating step occurs during said microwaving step.

22. A method for preparing a potato product having a low fat content in which none of the natural foodstuffs of the potato are removed, said method comprising the following steps: cutting a potato to produce a plurality of potato slices; heating the slices at a temperature and for a time sufficient to remove from about 65% to 70% of the moisture from the slices; and microwave heating the heated slices at a power level and for a time sufficient to produce a product having substantially the same flavor, color, crispness and slightly greasy appearance as deep-fried potato chips and having no added fat content.

23. The method of claim 22 including the step of adding salt to the potato slices prior to the microwave heating step.

24. The method of claim 22 including the step of adding natural seasoning to the potato slices after the microwave heating step.

25. The method of claim 22 wherein said heating step comprises baking said slices in an oven at a temperature within the range of about 250° to 900° Fahrenheit.

26. The method of claim 22 wherein said heating step comprises baking said slices in an oven at a temperature within the range of about 500° to 900° Fahrenheit.

27. The method of claim 22 wherein said microwaving step occurs continuously.

28. The method of claim 22 wherein at least a portion of said heating step occurs during said microwaving step.

29. A method for preparing a potato product having a low fat content in which none of the natural foodstuffs of the potato are removed, said method comprising the following steps: cutting a potato to produce a plurality of potato slices; heating the slices at a temperature and for a time sufficient to remove from about 65% to 70% of the moisture from the slices; and microwave heating the heated slices for a period of about 20 seconds to 5 minutes to produce a product having substantially the same flavor, color, crispness and slightly greasy appearance as deep-fried potato chips and having no added fat content.

30. A method for preparing a potato product having a low fat content in which none of the natural foodstuffs of the potato are removed, said method comprising the following steps: cutting a potato to produce a plurality of potato slices; heating the slices at a temperature and for a time sufficient to remove from about 65% to 70% of the moisture from the slices; microwave heating the heated slices at a first power level for a period of about 20 seconds to 5 minutes; and then microwave heating the heated slices at a second power level lower than said first power level to produce a product having substantially the same flavor, color, crispness and slightly greasy appearance as deep-fried potato chips and having no added fat content.

31. The method of claim 30 wherein said chips are heated at said second power level for a period of about 1 to 6 minutes.

32. A method for preparing a potato product having a low fat content in which none of the natural foodstuffs of the potato are removed, said method comprising the following steps: cutting a potato product to produce a plurality of potato slices; heating the slices at a temperature and for a time sufficient to remove from 50% to 80% of the moisture from the slices; microwave heating the heated slices for a period of about 20 seconds to 5 minutes; and then subjecting the slices to radio frequency waves to reduce the moisture of the slices and produce a product having substantially the same flavor, color, crispness and slightly greasy appearance as deep-fried potato chips and having no added fat content.

33. The method of claim 32 including adding salt to the potato slices prior to the microwave heating step.

34. The method of claim 32 including the step of adding natural seasonings to the potato slices after the microwave heating step.

35. The method of claim 34 wherein said first heating step comprises baking said slices in an oven at a temperature within the range of about 250° to 900° Fahrenheit.

36. A method for preparing a potato product having a low fat content in which none of the natural foodstuffs of the potato are removed, said method comprising the following steps: cutting a potato to produce a plurality of potato slices; applying vinegar to said slices; heating the slices at a temperature and for a time sufficient to remove from 50% to 80% of the moisture from the slices; and microwave heating the heated slices at a power level and for a time sufficient to produce a product having substantially the same flavor, color, crispness and slightly greasy appearance as deep-fried potato chips and having no added fat content.

37. A method for preparing a potato product having a low fat content in which none of the natural foodstuffs of the potato are removed, said method comprising the following steps: cutting a potato to produce a plurality of potato slices; applying vinegar to said slices; heating the slices at a temperature and for a time sufficient to remove from about 65% to 70% of the moisture from the slices; and microwave heating the heated slices at a power level and for a time sufficient to produce a product having substantially the same flavor, color, crispness and slightly greasy appearance as deep-fried potato chips and having no added fat content.

38. A method for preparing a potato product having a low fat content in which none of the natural foodstuffs of the potato are removed, said method comprising the following steps: cutting a potato to produce a plurality of potato slices; heating the slices at a temperature and for a time sufficient to remove from 50% to 80% of the moisture from the slices; microwave heating the heated slices at a first power level for a first period of time; and then microwave heating said slices at a second power level for a second period of time, said second power level being lower than said first power level, to produce a product having substantially the same flavor, color, crispness and slightly greasy appearance as deep-fried potato chips and having no added fat content.

39. The method of claim 38 wherein said first power level is at least 50% greater than said second power level.

40. A method for preparing a potato product having a low fat content in which none of the natural foodstuffs of the potato are removed, said method comprising the following steps: cutting a potato to produce a plurality of potato slices; heating the slices at a temperature and for a time sufficient to remove from about 65% to 70% of the moisture from the slices; microwave heating the heated slices at a first power level for a first period of time; and then microwave heating said slices at a second power level for a second period of time, said second power level being lower than said first power level, to produce a product having substantially the same flavor, color, crispness and slightly greasy appearance as deep-fried potato chips and having no added fat content.

41. The method of claim 40 wherein said fist power level is at least 50% greater than said second power level.

42. A method for preparing a potato product having a low fat content in which none of the natural foodstuffs of the potato are removed, said method comprising the following steps: cutting a potato to produce a plurality of potato slices; heating the slices at a temperature and for a time sufficient to remove from 50% to 80% of the moisture from the slices; microwave heating the heated slices at a power level and for a time sufficient to produce a product having substantially the same flavor, color, crispness and slightly greasy appearance as deep-fried potato chips and having no added fat content; and then heating the chips to reduce the moisture content thereof.

43. The method of claim 42 including the step of adding salt to the potato slices prior to the microwave heating step.

44. The method of claim 42 including the step of adding natural seasoning to the potato slices after the microwave heating step.

45. A method for preparing a potato product having a low fat content in which none of the natural foodstuffs of the potato are removed, said method comprising the following steps: cutting a potato to produce a plurality of potato slices; heating the slices at a temperature and for a time sufficient to remove from about 65% to 70% of the moisture from the slices; microwave heating the heated slices at a power level and for a time sufficient to produce a product having substantially the same flavor, color, crispness and slightly greasy appearance as deep-fried potato chips and having no added fat content; and then heating the chips to reduce the moisture content thereof.

46. The method of claim 45 including the step of adding salt to the potato slices prior to the microwave heating step.

47. The method of claim 45 including the step of adding natural seasoning to the potato slices after the microwave heating step.

48. A method for preparing a potato product having a low fat content in which none of the natural foodstuffs of the potato are removed, said method comprising the following steps: cutting a potato to produce a plurality of potato slices; steaming the slices for a time sufficient to provide the slices with a slick, shiny appearance; heating the steamed slices with a heated air flow at a temperature and for a time sufficient to remove from 50% to 80% of the moisture from the slices; and microwave heating the air heated slices to produce a product having substantially the same flavor, color, crispness and slightly greasy appearance as deep-fried potato chips and having no added fat content.

49. The method of claim 48 including the step of adding salt to the potato slices prior to the microwave heating step.

50. The method of claim 48 including the step of adding natural seasoning to the potato slices after the microwave heating step.

51. A method for preparing a tuber product having a low fat content in which none of the natural foodstuffs of the tuber are removed, said method consisting of the following steps: cutting a tuber to produce a plurality of tuber slices; heating the slices at a temperature and for a time sufficient to remove from 50% to 80% of the moisture from the slices; and microwave heating the heated slices for a period of about 20 seconds to 5 minutes to produce a product having substantially the same flavor, color, crispness and slightly greasy appearance as deep-fried tuber chips and having no added fat content.

52. A method for preparing a tuber product having a low fat content in which none of the natural foodstuffs of the tuber are removed, said method comprising the following steps: cutting a tuber to produce a plurality of tuber slices; heating the slices at a temperature and for a time sufficient to remove from 50% to 80% of the moisture from the slices; and microwave heating the heated slices at a power level and for a time sufficient to produce a product having substantially the same flavor, color, crispness and slightly greasy appearance as deep-fried tuber chips having no added fat content.

53. The method of claim 52 wherein said heating step comprises baking said slices in an oven at a temperature within the range of about 250° to 900° Fahrenheit.

54. A method for preparing a tuber product having a low fat content in which none of the natural foodstuffs of the tuber are removed, said method comprising the following steps: cutting a tuber to produce a plurality of tuber slices; heating the slices at a temperature and for a time sufficient to remove from 50% to 80% of the moisture from the slices; microwave heating the heated slices at a first power level for a period of about 20 seconds to 5 minutes; and then microwave heating the slices at a second power level lower than said first power level to produce a product having substantially the same flavor, color, crispness and slightly greasy appearance as deep-fried tuber chips having no added fat content.

55. A method for preparing a tuber product having a low fat content in which none of the natural foodstuffs of the tuber are removed, said method comprising the following steps: cutting a tuber product to produce a plurality of tuber slices; baking the slices for a period of about 20 seconds to 5 minutes within a temperature range of about 500° to 900° Fahrenheit; microwave heating the baked slices for a first power level for a period of about 10 to 90 seconds; and then microwave heating the slices at a second power level for about one to six minutes to produce a product having substantially the same flavor, color, crispness and slightly greasy appearance as deep-fried tuber chips having no added fat content.

56. A method for preparing a potato product having a low fat content in which none of the natural foodstuffs of the potato are removed, said method comprising the following steps: cutting a potato to produce a plurality of potato strips; heating the strips at a temperature and for a time sufficient to remove from 50% to 80% of the moisture from the strips; and microwave heating the heated strips at a power level and for a time sufficient to produce a product having substantially the same flavor, color, crispness and slightly greasy appearance as deep-fried shoestring potatoes and having no added fat content.

57. The method of claim 56 wherein said microwaving step occurs continuously.

* * * * *